United States Patent [19]

Kuusik

[11] 4,424,826
[45] Jan. 10, 1984

[54] FLYWEIGHT GOVERNOR

[75] Inventor: Uno Kuusik, Royal Oak, Mich.

[73] Assignee: Chrysler Corporation, Highland Park, Mich.

[21] Appl. No.: 349,542

[22] Filed: Feb. 17, 1982

[51] Int. Cl.³ .............................................. G05D 13/42
[52] U.S. Cl. .......................................... 137/54; 137/56
[58] Field of Search ..................................... 137/54, 56

[56] References Cited

U.S. PATENT DOCUMENTS 3,265,081  8/1966  Stockton .................................. 137/54
3,413,991 12/1968  Lewicki ................................... 137/54
3,559,667  2/1971  Koivunen ................................ 137/54

Primary Examiner—Robert G. Nilson
Attorney, Agent, or Firm—Newtson and Dundas

[57] ABSTRACT

A governor control valve is provided in which governor output pressure is varied in response to variations in vehicle speed by moving a valve member radially with respect to a ported shaft carried with a driven housing which drivingly carries a centrifugal force responsive weight mechanism. The ball valve and the weight mechanism are connected by a yoke member whose mass center is aligned with the axis of rotation of the housing and shaft.

9 Claims, 7 Drawing Figures

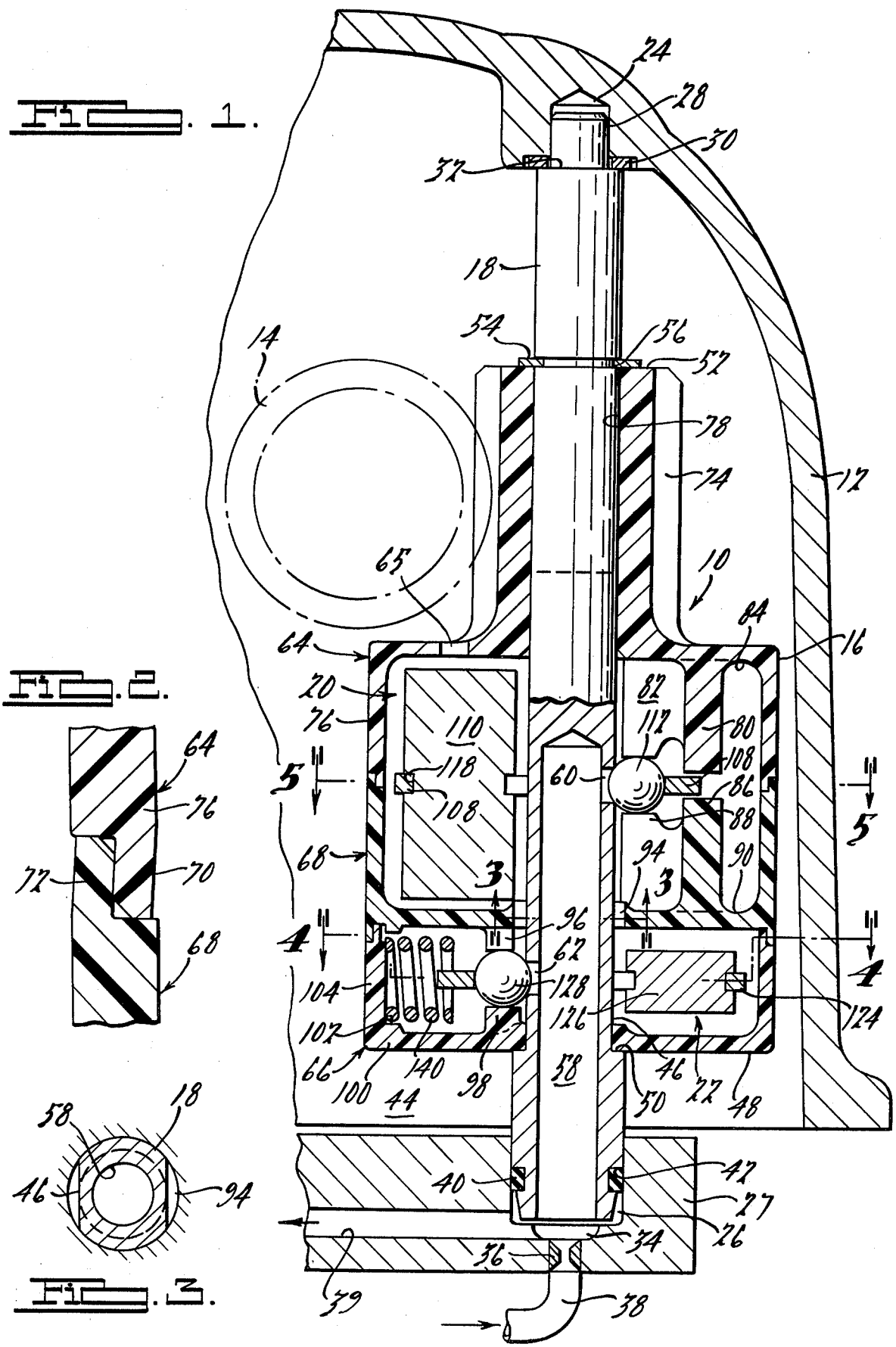

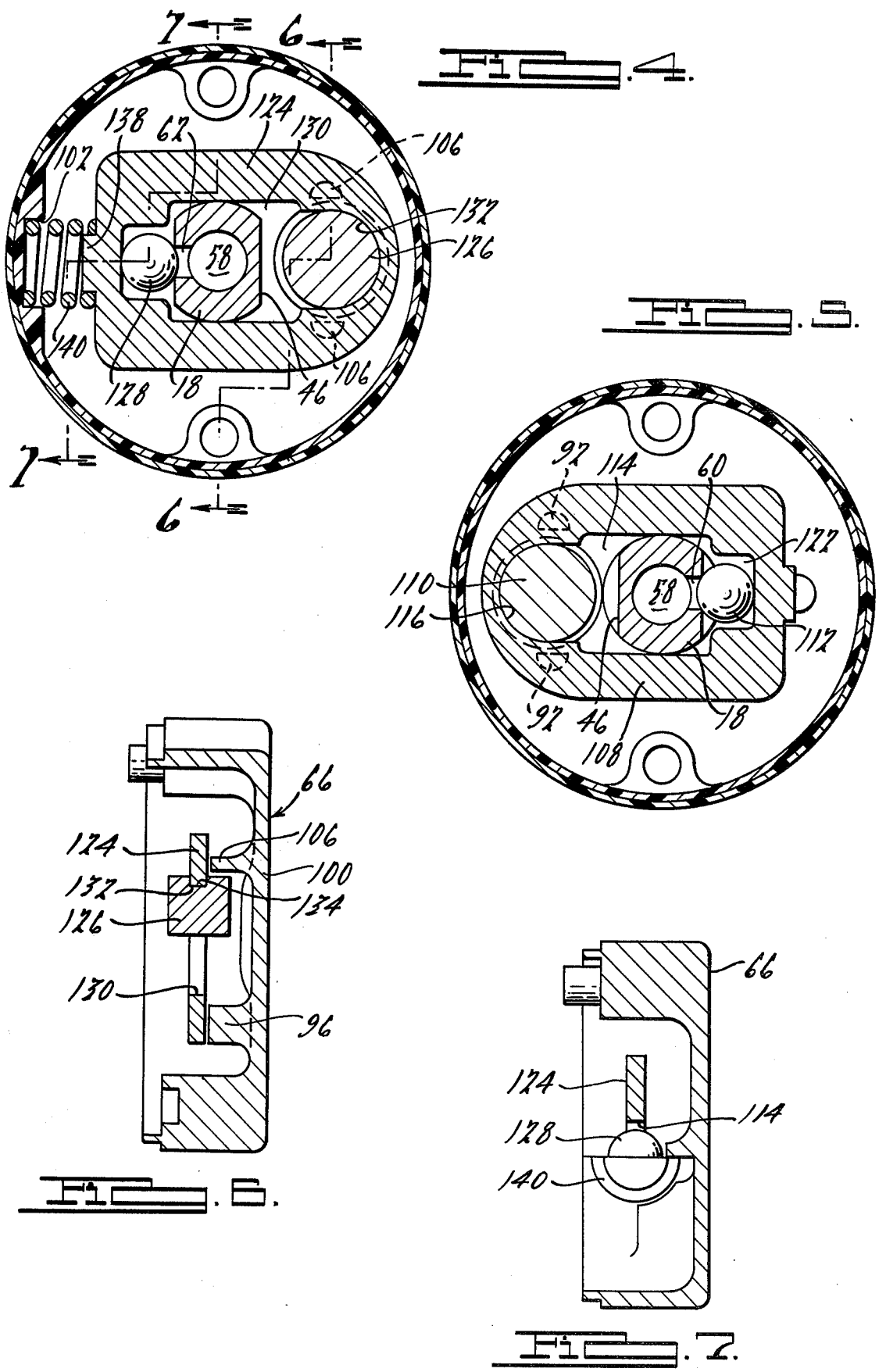

FLYWEIGHT GOVERNOR

BACKGROUND OF THE INVENTION

1. Field of the Invention

The present invention relates generally to centrifugal force operated hydraulic governors and relates more particularly to such governors incorporated into automotive automatic transmissions for providing a pressure signal varying with vehicle speed for effecting automatic selection of gear ratios.

2. Description of the Prior Art

Vehicle automatic transmissions generally employ hydraulically operated brakes and clutches for effecting automatic selection of two or more gear ratios. This automatic selection is in part dependent on vehicle speed. To provide a hydraulic signal indicative of vehicle speed centrifugal force operated hydraulic governors are generally employed.

Certain of such governors in widespread current use utilize sliding valve members carried for rotation with a portion of the transmission which move to positions operative to vary governor output pressure in response to changes in vehicle speed. Applicant's governor shown in U.S. Pat. No. 4,194,520 and assigned to the assignee of the present invention is exemplary of such governors. While these governors have proven to be effective and reliable in operation, they are limited in accuracy and predictability of output pressure because of variations in response of individual sliding valve members to changes in centrifugal force due to tolerance build-up.

Other governors, such as that disclosed in U.S. Pat. No. 3,559,667, have enhanced accuracy by use of a flyweight type mechanism to actuate their valving elements. To achieve this accuracy, however, extremely close tolerances on the thickness of the flyweight structure pivotally mounted on the transmission rotated element of the governor must be held. This requires cost and complication that is considered impractical for the large volume production experienced in vehicle automatic transmission manufacturing.

SUMMARY OF THE INVENTION

Responsive to the deficiencies in the prior art it is the primary object of the present invention to provide a governor that is both accurate and relatively inexpensive to produce.

The invention governor includes simple valve elements operatively connected to flyweight elements carried in a transmission driven housing for rotation in a plane normal to the axis of a governor shaft which is coaxial with the housing. The valve-to-weight connection is accomplished through a stamped yoke element whose mass center is essentially coincident with the governor's axis of rotation and is assembled to rotate in a plane normal to the axis of rotation so that variations in its thickness do not affect the accuracy of the governor in controlling its output pressure as a function of vehicle speed.

BRIEF DESCRIPTION OF THE DRAWINGS

In the accompanying drawings in which one embodiment of the invention governor is illustrated:

FIG. 1 is a cross sectional view of the governor of the present invention illustrated as installed in a housing of a vehicle automatic transmission;

FIG. 2 is an enlarged detail view of a housing connection portion of FIG. 1;

FIG. 3 is a partial section taken along line 3—3 of FIG. 1;

FIG. 4 is a section taken along line 4—4 of FIG. 1 showing the secondary stage of the governor;

FIG. 5 is a section taken along line 5—5 of FIG. 1 showing the primary stage of the governor;

FIG. 6 is a section taken along line 6—6 of FIG. 4; and

FIG. 7 is a section taken along lines 7—7 of FIG. 4.

DESCRIPTION OF THE PREFERRED EMBODIMENT

Turning now to the drawings the governor 10 of the present invention is illustrated as installed in a housing 12 of an automatic transmission in meshing engagement with a transmission output shaft 14. The governor 10 consists generally of a housing assembly 16 drivingly engaged by the transmission output shaft 14, a governor shaft 18 driven by the housing assembly 16, a primary speed responsive valve stage 20, and a secondary speed responsive valve stage 22, both of the valve stages being carried for rotation with the housing assembly 16.

In the preferred embodiment disclosed the governor shaft 18 is journalled in aligned bores 24,26 formed in portions of the transmission housing 12 and valve body transfer plate 27, respectively. The bore 24 is a blind positioning bore which receives a reduced diameter portion 28 of the governor shaft 18 and which includes a counterbore for receiving a washer member 30 which abuts the shoulder 32 terminating the reduced diameter portion 28. The bore 26 terminates in a pocket 34 which connects a fixed inlet orifice 36 with a source 38 of fluid at transmission line pressure and with governor pressure exit passage 39.

This fluid source could be a fixed displacement pump (not shown), but it should be understood that any material source of transmission line pressure may be used.

A dynamic sealing element 40 is carried in a groove 42 of the shaft 18 for sealing the pocket 34 with respect to the interior 44 of the transmission housing 12.

The governor shaft 18 further includes a flatted portion 46 for drivingly engaging the housing assembly 16. One end 48, the lower end as viewed in FIG. 1, of the housing assembly 16 abuttingly engages a shoulder 50 terminating the flatted portion 46, and the other end 52 is positioned to be engaged by a locking ring 54 carried in a groove 56 formed in the governor shaft 18 to effect axial retention of the housing assembly 16.

Also formed in the governor shaft 18 is an axially extending bore 58 communicating with the pocket 34 and a pair of radially extending bores 60,62 axially positioned to form valve ports of the primary and secondary speed responsive valve stages, respectively.

Turning next to the housing assembly 16, it is illustrated as comprising a geared housing 64 drivingly engaged by the transmission output shaft 14, a base housing 66 drivingly engaging the governor shaft 18, and an intermediate housing 68. The three housings 64,66,68 are preferably formed of plastic and include oppositely canted tabs such as shown typically at 70,72 in FIG. 2 to permit snap fit assembly and mutual axial retention.

Geared housing 64 is formed in a stepped configuration having a drive gear portion 74 and a substantially cylindrical cup-like housing portion 76. An axially extending through bore 78 traverses the geared housing 64 for receiving the shaft 18 and projections 80,82 extend from the inner axial wall 84 of housing portion 76 to cooperate with opposed projections 86,88 extending from an axial wall 90 of intermediate housing 68 in axially positioning primary valve stage 20. Also extending from the upper surface of wall 90 of the intermediate housing 68 is a pair of driving lugs 92 (as may be seen in FIG. 5) which engage portions of the primary valve stage 20 to angularly position the valve stage. An axial drain port 65 is shown formed in the geared housing 64. The governor housing may be either oil filled during operation and vented through axial port 65 or drained by numerous radially exiting ports (not shown) from each valve stage, depending upon the design oil level in the transmission.

The generally cylindrical intermediate housing 68 also includes a central through bore 94 for receiving the governor shaft flatted portion 46 thereby defining a fluid drain between primary and secondary valve stages 20,22 as may best be seen in FIG. 3. In addition, the housing 68 includes projections 96 for axially positioning the secondary valve stage 22.

The generally cup-shaped base housing 66 is illustrated as including projections 98 extending from its bottom wall 100 and registering with the projections 96 of intermediate housing 68 for positioning the secondary valve stage 22. It is illustrated as further including a spring seat pocket 102 formed in its side wall 104 and a pair of drive lug projections 106 for angularly positioning the secondary valve stage 22 as may best be seen in FIGS. 4 and 6.

Turning again to FIG. 1, the primary valve stage assembly 20 is illustrated as comprising a yoke member 108 operatively interconnecting a cylindrical first weight member 110 and a first ball valve member 112. The yoke member 108 is preferably formed as a precision stamping having a generally rectangular central opening 114 having a semi-circular end wall 116 for assembly over the governor shaft 18 as may best be seen in FIG. 5. An axially central groove 118 formed in the first weight member 110 receives the semi-circular end wall 116 of the yoke member 108. A pocket 122 extends from the other end wall of the central opening 114 to receive the ball valve member 112, locating it with respect to the governor shaft port 60.

The secondary valve stage 22 is constructed in a manner similar to the primary valve stage 20, having a yoke member 124 operatively interconnecting a second weight member 126 and a second ball valve member 128. The yoke member 124 likewise includes a central opening 130 having a semi-circular end wall 132 for receiving the second weight member 126 at its axially central groove 134, and a pocket 136 for locating the ball 128 with respect to the governor shaft port 62. It further includes a spring guide tab 138 for receiving one end of a preload compression coil spring 140, the other end of which is received in the pocket 102 of base housing 66. It will be noted that both of the weight members 110 and 126 preferably have identical diameters, but differ in their axial dimensions. As weight member 110 has the greater axial dimension the weight member 110 is heavier than the weight member 126.

OPERATION OF THE PREFERRED EMBODIMENT

With the vehicle at rest with its engine in operation the transmission pump 38 provides pressurized fluid to the housing pocket 34 which is in fluid communication with the governor shaft bore 58. Since the primary valve stage is unloaded in this condition, fluid passes through the port 60 and is exhausted to the transmission case through the drain port 65 of geared housing 64. Communication is provided in the transmission between the pocket 34 and elements whose operation is desired to be responsive to vehicle speed. It is easily understood that the pressure in pocket 34 is relatively low, then, when the vehicle is at rest.

As vehicle speed increases the rotational speed of the transmission output shaft 14 increases together with the governor assembly 10 since the housing assemblies 64,66,68 are driven through the geared housing 64 and the governor shaft is driven by the housings (directly by the base housing 66 in the preferred embodiment). During acceleration and deceleration the primary and secondary valve stages are driven to rotate with shaft and housing through the housing drive lugs 92 and 106, respectively. With increasing rotational speed of the shaft 18 the weight members 110 and 126 tend to move radially outwardly under the influence of centrifugal force. At low speeds, however, spring 140 operates to load yoke 124 in a manner causing ball 128 to sealingly engage port 62. The heavier weight member 110, moves outwardly to gradually urge ball 112 toward engagement with bore or port 60 creating a second order variation of pressure in pocket 34 with speed.

Since weight member 110 may be relatively large, the pressure-speed curve may be steep, thus making it desirable to modify the curve by the described parallel connection of the secondary valve stage 22. Weight member 126 and spring 140 are chosen so that at some predetermined speed centrifugal force acting on the weight 126 together with the force exerted by compression spring 140 are overcome by the fluid governor pressure in pocket 34. This results in moving the ball 128 away from the port 62. The primary stage 20 closes at some predetermined increase in speed. The secondary stage 22 thereafter controls the governor fluid pressure in pocket 34 with the spring 140 and second weight member 126 acting in series through the yoke 124 and the ball 128 to yield a shallower pressure-speed curve, i.e. one in which pressure in pocket 34 increases less with increasing shaft speed. See the two-stage pressure-speed curve of U.S. Pat. No. 3,559,667 as an example.

While only one embodiment of the invention governor has been described those skilled in the art will appreciate that others are possible without departing from the scope of the following claims.

What is claimed is:

1. A fluid pressure governor device for supplying a fluid pressure proportional to speed comprising a rotatable shaft, an axial passage formed in said shaft, a source of fluid pressure for said axial passage; an inlet passage in said shaft connecting said source to said axial passage, an outlet passage connecting said axial passage to exhaust having seat means for a relief valve member therein such that said valve member is movable between an outer open and an inner closed seated position for controlling flow from said axial passage to exhaust, said valve member biased by fluid pressure in said axial passage towards its outer open position, the improvement comprising housing means supported concentrically on said shaft for rotation therewith, said housing means operative for supporting a flyweight yoke assembly for rotation therewith in a plane normal to the axis of rotation of said shaft, said yoke assembly including a yoke member having a central opening for receiving said shaft therethrough, said opening adapted at one end for retaining with said shaft a weight member and adapted at its other end for retaining with said housing means said valve member, said yoke operative for predetermined movement in said plane such that its center of mass remains substantially coincident with the shaft axis of rotation, said housing means including yoke assembly engaging means causing said yoke assembly to rotate in unison with said housing means, said weight member operative during increasing rotational speed of said shaft to move radially outwardly under centrifugal force to gradually urge said valve member radially inwardly towards its seated position to prevent flow of the fluid from said axial passage to exhaust.

2. The governor device as set forth in claim 1 wherein said valve member comprising a ball.

3. The governor device as set forth in claim 1 wherein a spring is captured between said yoke and said housing means to tend to move said valve member inwardly toward said seat means.

4. The governor device as set forth in claim 1 wherein said yoke may be stamped from plate stock material wherein normal tolerance variations in the plate stock thicknesses do not affect the accuracy of the governor device in controlling its output pressure as a function of shaft rotational speed.

5. The governor device as set forth in claim 1 wherein primary and secondary yoke assemblies are carried for rotation with the housing means, with each said yoke assembly having substantially identical yoke members each retaining first and second weight members of predetermined unequal masses such that said second weight has a defined mass smaller than said first weight; and wherein said secondary yoke member having spring means tending to move its associated valve member inwardly toward its seat means, such that when the device is stationary there is no seating force applied to the primary valve member while said spring means exerts a seating force on its associated secondary valve member maintaining same on its seat means to seal the shaft secondary outlet passage.

6. A two stage pressure governor device for supplying a fluid pressure proportional to speed comprising a rotatable shaft, an axial passage formed in said shaft, a source of fluid pressure for said axial passage; a restricted inlet passage connecting said source to said chamber axial passage, primary and secondary outlet passages in said shaft each connecting said axial passage to exhaust with each outlet passage defining a seat for a ball valve member therein, each said ball member being radially movable between an outer open and an inner closed seated position for controlling flow from its associated axial passage to exhaust and biased by fluid pressure in said axial passage towards its open position, housing means supported concentrically on said shaft for rotation therewith, said housing means operative for supporting primary and secondary flyweight yoke assemblies, each said yoke assembly operative for rotation in a plane normal to the axis of rotation of said shaft, each said yoke assembly including substantially identical yoke members stamped from plate stock material having a central elongated opening for receiving said shaft therethrough, each said yoke opening adapted at one end for capturing together with said shaft a weight member, each yoke opening adapted at its other end for capturing together with said housing means its associated ball, each said yoke assembly having its center of mass substantially coincident with the shaft axis of rotation, said housing means including yoke engaging means causing each said yoke assembly to rotate in unison with said shaft, said secondary yoke assembly member having a compression coil spring between its associated yoke and said housing means tending to move its associated ball inwardly toward its seat, such that when the device is stationary there is no seating force on the primary ball, while said spring exerts a seating force on its associated ball maintaining some on its seat to seal the second shaft outlet passage, said primary yoke assembly weight member operative during increasing rotational speed of said shaft to move radially outwardly under centrifugal force to move its associated ball into contact with its seat by means of said yoke planar travel, said secondary yoke assembly weight member of a predetermined mass less than said primary yoke assembly weight member such that upon said shaft reaching a predetermined rotational speed the fluid pressure in said axial passage overcoming the combined spring force and the centrifugal force on said secondary yoke assembly weight member to unseat the secondary valve ball.

7. The governor device as set forth in claim 1 wherein said weight member is in the form of a cylindrical member, said cylindrical member having an annular groove at its central region, said yoke having its central opening formed with a semi-circular end wall, said semi-circular end wall having a defined radius such that said groove receives a portion of said semi-circular end wall whereby said weight member is retained against axial movement.

8. The governor device as set forth in claim 7 wherein each said weight member is in the form of a cylindrical member, each said cylindrical member having a groove at its central region, each said yoke having its central opening formed with a semi-circular end wall, each said semi-circular end wall having a defined radius such that the groove of its associated weight receives a portion of its semi-circular end wall, whereby each said weight member is retained against axial movement.

9. The governor device as set forth in claim 8 wherein each said weight has the same diameter and whereby said secondary yoke member weight member has a height a predetermined dimension less than the height of said primary yoke member weight member.

* * * * *